(12) United States Patent
Koo et al.

(10) Patent No.: US 9,591,430 B2
(45) Date of Patent: Mar. 7, 2017

(54) TEMPORARY IDENTIFIERS AND EXPIRATION VALUES FOR DISCOVERABLE USER EQUIPMENTS (UES)

(71) Applicant: BlackBerry Limited, Waterloo (CA)

(72) Inventors: Changhoi Koo, Plano, TX (US); Noun Choi, Flower Mound, TX (US); Joon Beom Kim, Carrolton, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 80 days.

(21) Appl. No.: 14/028,067

(22) Filed: Sep. 16, 2013

(65) Prior Publication Data

US 2015/0079906 A1    Mar. 19, 2015

(51) Int. Cl.
| | | |
|---|---|---|
| *H04W 8/00* | (2009.01) | |
| *H04W 4/00* | (2009.01) | |
| *H04W 12/06* | (2009.01) | |
| *H04W 4/20* | (2009.01) | |
| *H04W 8/06* | (2009.01) | |
| *H04W 4/06* | (2009.01) | |

(52) U.S. Cl.
CPC ........... *H04W 4/008* (2013.01); *H04W 4/005* (2013.01); *H04W 8/005* (2013.01); *H04W 12/06* (2013.01); *H04W 4/06* (2013.01); *H04W 4/206* (2013.01); *H04W 8/06* (2013.01)

(58) Field of Classification Search
CPC ............. H04W 8/0005; H04W 40/242; H04W 40/246; H04W 48/10
USPC ...................... 455/41.1, 41.2, 41.3
See application file for complete search history.

(56) References Cited

U.S. PATENT DOCUMENTS

| | | | |
|---|---|---|---|
| 7,668,159 B2 | 2/2010 | Buckley et al. | |
| 7,706,539 B2 * | 4/2010 | Jang et al. | ..... 380/270 |
| 7,710,950 B2 | 5/2010 | Buckley et al. | |
| 2006/0059346 A1 | 3/2006 | Sherman et al. | |

(Continued)

FOREIGN PATENT DOCUMENTS

| | | |
|---|---|---|
| EP | 1703760 | 9/2006 |
| EP | 2161963 | 3/2010 |

OTHER PUBLICATIONS

3rd Generation Partnership Project; Technical Specification Group Services and System Aspects; Study on architecture enhancements to support Proximity Service (ProSe) (Release 12) 3GPP TR 23.703 V0.4.1, release date Jun. 2013, 85 pages.

(Continued)

*Primary Examiner* — Wen Huang
(74) *Attorney, Agent, or Firm* — Fish & Richardson P.C.

(57) ABSTRACT

A temporary identifier is assigned to a discoverable user equipment (UE) in an assignment, an expiration value is assigned to the assignment, and the temporary identifier and the expiration value are associated to a long-term identifier of the discoverable UE. The temporary identifier and an indication of the expiration value are provided to the discoverable UE. The temporary identifier and an indication of the expiration value are provided to a discovering UE responsive to receipt of an inquiry including the long-term identifier of the discoverable UE The discoverable UE broadcasts the temporary identifier. If the broadcast is heard by the discovering UE, the discovering UE may identify that the broadcast is from the discoverable UE, based on the association of the long-term identifier to the temporary identifier.

9 Claims, 11 Drawing Sheets

(56) References Cited

U.S. PATENT DOCUMENTS

| | | | | |
|---|---|---|---|---|
| 2007/0149122 | A1* | 6/2007 | Murphy | 455/41.2 |
| 2008/0318549 | A1* | 12/2008 | Skubic et al. | 455/411 |
| 2010/0069067 | A1* | 3/2010 | Vanderveen | H04L 63/0823 |
| | | | | 455/435.1 |
| 2012/0163235 | A1* | 6/2012 | Ho | H04W 76/023 |
| | | | | 370/254 |
| 2013/0029591 | A1* | 1/2013 | Park et al. | 455/7 |
| 2013/0059583 | A1* | 3/2013 | Van Phan et al. | 455/435.1 |
| 2013/0145151 | A1 | 6/2013 | Brown et al. | |
| 2013/0145153 | A1 | 6/2013 | Brown et al. | |
| 2013/0208697 | A1* | 8/2013 | Hwang et al. | 370/331 |
| 2014/0162601 | A1* | 6/2014 | Kim et al. | 455/411 |
| 2014/0206322 | A1* | 7/2014 | Dimou et al. | 455/414.1 |
| 2014/0256262 | A1* | 9/2014 | Park et al. | 455/41.2 |
| 2014/0274192 | A1* | 9/2014 | Zhu et al. | 455/522 |
| 2014/0316923 | A1* | 10/2014 | Jung et al. | 705/26.3 |
| 2014/0378123 | A1* | 12/2014 | Stojanovski et al. | 455/422.1 |

OTHER PUBLICATIONS

3rd Generation Partnership Project; Technical Specification Group Services and System Aspects; Feasibility study for Proximity Services (ProSe) (Release 12) 3GPP TR 22.803 V12.2.0, release date Jun. 2013, 45 pages.

3GPP TSG SA WGS Meeting #96, "ProSe solution for direct discovery",TD S2-131429, presented Apr. 8-12, 2013, 3 pages.

3GPP TSG SA Metting #59, "Revised WID Proximity-Based Services (ProSe)", TD SP-130030, presented Mar. 4-6, 2013, 6 pages.

3GPP TSG RAN Meeting #58,"Study on LTE Device to Device Proximity Services", RP-122009, Dec. 2012, 6 pages.

3GPP SA WG2 Meeting #96,"Solution for direct discovery and communication", S2-131505, presented Apr. 8-12, 2013, 6 pages.

Interdigital Communications et al: "Assignment of Prose identifiers and a procedure to register & authorize for Prose services", 3GPP Draft; S2-132707 Prose Registration Discovery, 3rd Generation Partnership Project (3GPP), Mobile Competence Centre ; 650, Route Des Lucioles; F-06921 Sophia-Antipolis Cedex; France vol. SA WG2, No. Valencia, Spain; Jul. 15, 2013-Jul. 19, 2013, Jul. 9, 2013.

Alcatel-Lucent: "Prose identifiers used for solutions 6.1.6 and 6.1.7 and 6.2.2 of TR 23. 703", 3GPP Draft; S2-132564 Prose Identifiers, 3rd Generation Partnership Project (3GPP), Mobile Competence Centre ; 650, Route Des Lucioles; F-06921 Sophia-Antipolis Cedex; France; vol. SA WG2, No. Valencia, Spain; Jul. 15, 2013-Jul. 19, 2013; Jul. 9, 2013.

Blackberry Limited: "Proposing random and temporary Prose Identity", 3GPP Draft; S2-133402 Random and Temporary Prose Identity, 3rd Generation Partnership Project (3GPP), Mobile Competence Centre; 650, Route Des Lucioles ; F-06921 Sophia-Antipolis Cedex; France; vol. SA WG2, No. Xiamen, P.R. China; Sep. 23, 2013-Sep. 27, 2013; Sep. 18, 2013.

Extended European Search Report issued in European Application No. 14184424.1 on Feb. 24, 2015; 10 pages.

* cited by examiner

TEMPORARY IDENTIFIERS AND EXPIRATION VALUES FOR DISCOVERABLE USER EQUIPMENTS (UES)

BACKGROUND

Device-to-Device Proximity Services (ProSe) are attracting increasing interest among the 3$^{rd}$ Generation Partnership Project (3GPP) community.

BRIEF DESCRIPTION OF DRAWINGS AND APPENDICES

GLOSSARY

The following terms are defined in 3GPP TR 22.803, "Feasibility Study for Proximity Services (ProSe)".

Proximity: A UE is in proximity of another UE when given proximity criteria are fulfilled. Proximity criteria can be different for discovery and communication.

ProSe Discovery: a process that identifies that a UE is in proximity of another, using E-UTRA (Evolved Universal Terrestrial Radio Access).

ProSe Communication: a communication between two UEs in proximity by means of a communication path established between the UEs. The communication path could for example be established directly between the UEs or routed via one or more local eNB(s).

ProSe-enabled UE: a UE that supports ProSe Discovery and/or ProSe Communication. Throughout this document, a UE refers to a ProSe-enabled UE.

ProSe-enabled Network: a network that supports ProSe Discovery and/or ProSe Communication. Throughout this document, a network refers to a ProSe-enabled network.

Open ProSe Discovery: is ProSe Discovery without explicit permission from the UE being discovered.

Restricted ProSe Discovery: is ProSe Discovery that only takes place with explicit permission from the UE being discovered.

ProSe Group Communication: a one-to-many ProSe Communication, between two or more UEs in proximity, by means of a common communication path established between the UEs.

ProSe Broadcast Communication: a one-to-all ProSe Communication, between all authorized UEs in proximity, by means of a common communication path established between the UEs.

Additionally, the following terms are defined for this document.

ProSe-enabled Application: is an application that is authorized to utilize ProSe services.

ProSe Server: is an element of a ProSe-enabled Network that offers ProSe services.

DETAILED DESCRIPTION

A discoverable UE, which is a ProSe-enabled UE that supports ProSe Discovery, may announce its identity via a ProSe Broadcast Communication to all UEs within transmission range.

Figure 1:
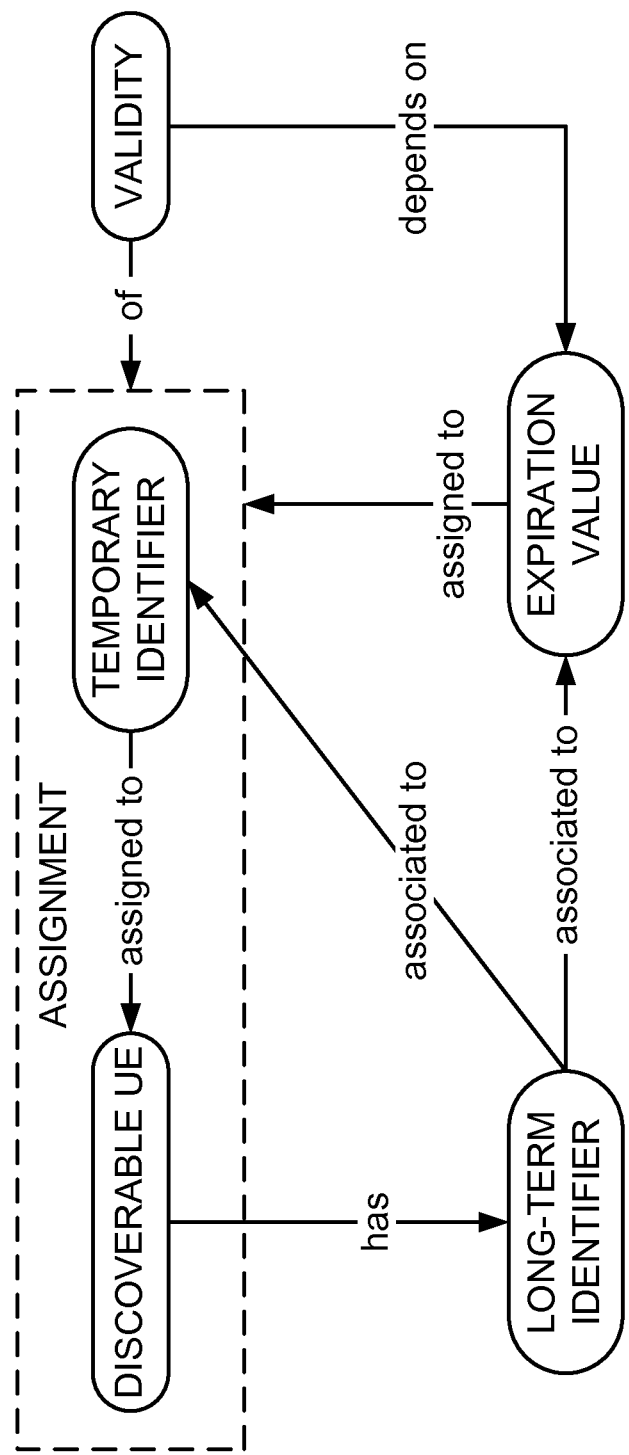
FIG. 1 is an entity relationship diagram.

This document proposes that the discoverable UE announce its identity using a temporary identifier from which it is not possible to derive a true identity of the discoverable UE. An assignment of the temporary identifier to the discoverable UE is valid as long as an expiration value assigned to the assignment has not yet expired. These concepts are illustrated in an entity relationship diagram in FIG. 1.

The assignment of the expiration value ensures the temporary nature of the temporary identifier. The expiration value may be implemented as an expiration time. Alternatively, the expiration value may be implemented as an expiration counter that counts, for example, in units of subframes or in units of frames. While the assignment is valid, the temporary identifier uniquely identifies the discoverable UE to which it has been assigned, and the temporary identifier can be used for ProSe Discovery of that discoverable UE and for ProSe Communication with that discoverable UE. The assignment is no longer valid once the expiration value has expired. Once the assignment is no longer valid, the temporary identifier cannot be used for ProSe Discovery of that discoverable UE and cannot be used for ProSe Communication with that discoverable UE.

Any UE or network node or application server that stores the details of a valid assignment (a long-term identifier of the discoverable UE, a temporary identifier, and an indication of the expiration value) will cease to store those details, or will mark the assignment as no longer valid, once the expiration value has expired. Thus no additional signaling overhead is required to notify parties of lack of validity of an assignment.

A temporary identifier that was assigned to a first UE and the expiration value of which has expired may subsequently be assigned to a second UE with a new expiration value. Thus the set of temporary identifiers is a renewable resource, with the temporary identifiers shared (at different times) among different UEs. The use of temporary identifiers is therefore more scalable than the use of permanent identifiers, because the temporary identifiers can be reused, and the UEs do not always need to make use of temporary identifiers.

The use of temporary identifiers protects the privacy of the person using the UE. It is not recommended for the UE to broadcast any of its network identifiers (e.g. IMSI), as doing so will enable eavesdroppers to identify and track use of the UE over the radio interface. It is also not recommended for the UE to broadcast any of its application-layer identifiers (e.g. a network access identifier such as username@domain), as doing so will expose the application-layer identifier to malicious misuse.

The use of temporary identifiers offers some protection from tracking. One reason for the protection is that the same temporary identifier may be assigned for a first period of time to a first UE and then, after that assignment is no longer valid, assigned for a second period of time to a second UE that is different from the first UE. Thus an eavesdropper tracking the temporary identifier during the first period of time will likely never again observe use of that temporary identifier after the first period of time, and therefore the tracking will fail after the assignment of the temporary identifier to the first UE is no longer valid. Another reason for the protection is that different temporary identifiers are assigned to the same UE for different periods of time, so an eavesdropper may not be able to detect that two transmissions—one with a first temporary identifier and the other with a second temporary identifier—originate from or are destined for the same UE.

An element of a ProSe-enabled Network ("network node"), for example, a ProSe server, or an Evolved Node B (eNB), or a Mobility Management Entity (MME), may control the assignment of temporary identifiers to discoverable UEs and the validity of the assignments through the use of expiration values. Network-facilitated discovery is described in the document with respect to FIG. 2 through FIG. 8.

Alternatively, controlling the assignment of temporary identifiers to discoverable UEs and controlling the validity of the assignments through the use of expiration values may be performed by another UE without participation of a network. In this alternative, the UE controlling the assignment of temporary identifiers and the validity of the assignments may be a UE of higher class in a hierarchy of UEs than the discoverable UEs. This alternative may be used when the discoverable UE and the UE of higher class are out-of-range of a ProSe-enabled Network. This alternative may also be used even though the discoverable UE is within range of a ProSe-enabled Network. This alternative is particularly suitable for Public Safety ProSe-enabled UEs. This alternative is described in this document with respect to FIG. 9 through FIG. 11.

Figure 2:
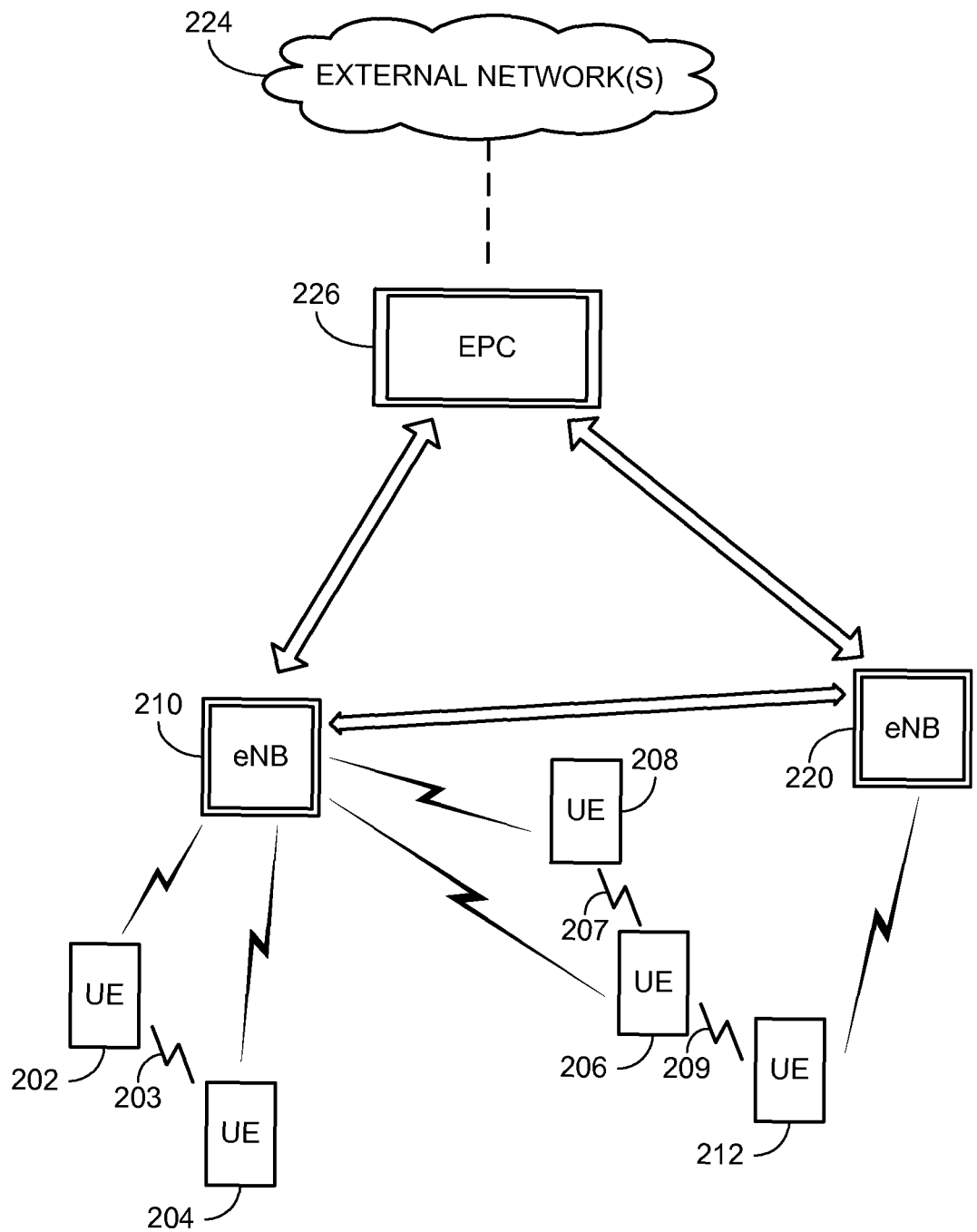
FIG. 2 is an example network architecture illustration.

FIG. 2 is an illustration of an example network architecture. UEs 202, 204, 206 and 208 are served by an eNB 210. A UE 212 is served by an eNB 220. The eNB 210 and the eNB 220 are both coupled to external networks 224 via an Evolved Packet Core (EPC) 226. In the illustrated example, the UE 202 and the UE 204, while both served by the same eNB, are in close proximity to each other and therefore may be able to establish a direct communication link 203 therebetween. Though the UE 206 and the UE 212 are served by different eNBs in the illustrated example, they are in close proximity to each other and therefore may be able to establish a direct communication link 209 therebetween. When the UE 208 is not in close proximity to the UE 212, the UE 208 and the UE 212 may have a communication link through the UE 206, where the communication link comprises a direct communication link 207 established between the UE 208 and the UE 206, and the direct communication link 209. The direct communication links 203, 207 and 209 employ direct UE-to-UE signaling with E-UTRA technology.

Figure 3:
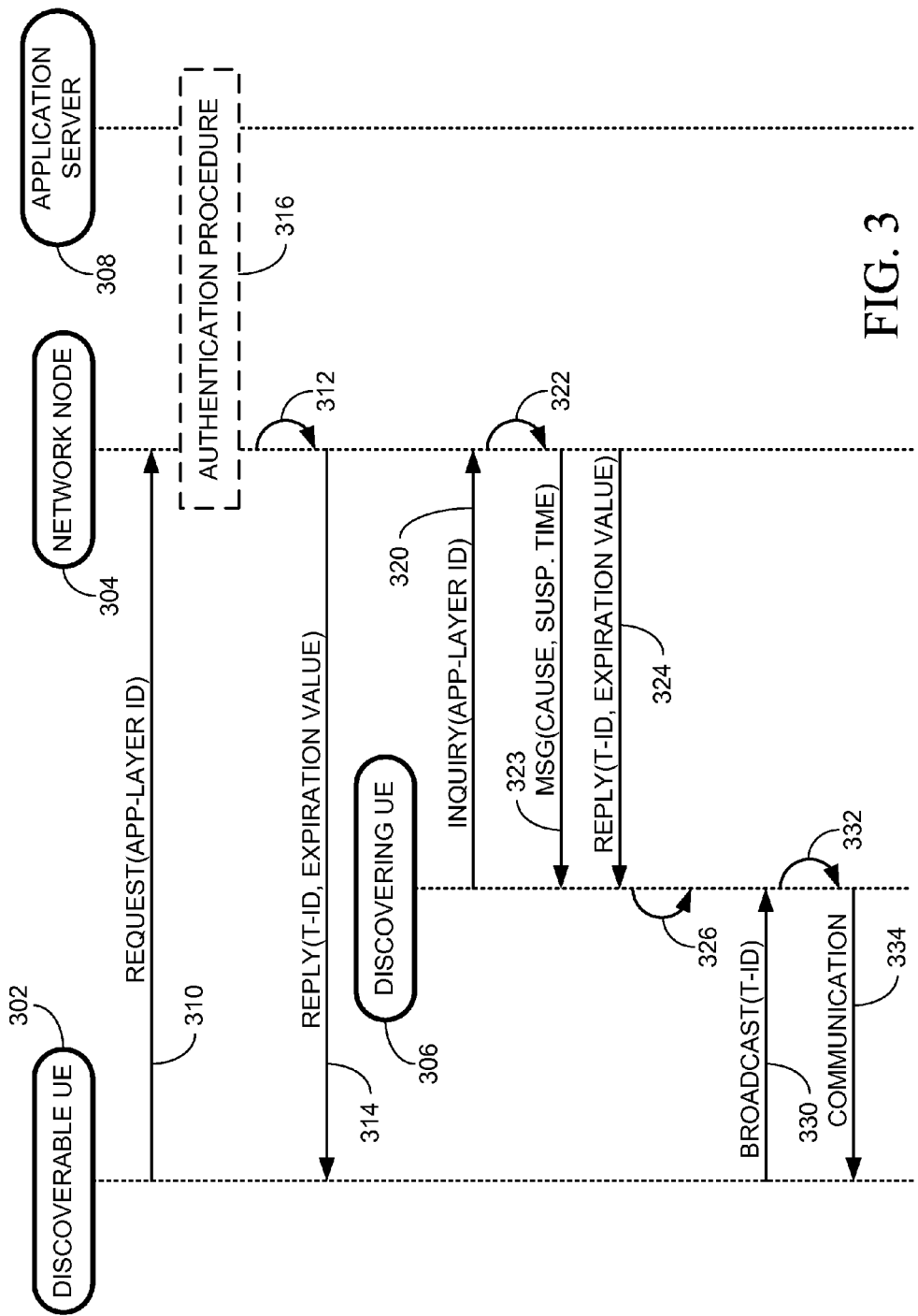
FIG. 3 is an example signaling diagram for facilitating discovery of a discoverable user equipment (UE) having only a single ProSe-enabled application installed thereon.

FIG. 3 is an example signaling diagram involving a discoverable UE 302, a network node 304, and a discovering UE 306. The network node 304 is part of a ProSe-enabled Network, for example, a ProSe server, or an evolved Node B (eNB), or a Mobility Management Entity (MME). The signaling diagram may optionally involve an application server 308. The application server 308 may be operated by the operator of the ProSe-enabled Network or by a third-party service provider. For this example signaling diagram, the discoverable UE 302 has installed thereon only one ProSe-enabled application, which discovers and connects with the application server 308, and the discovering UE 306 also has installed thereon that same ProSe-enabled application (other ProSe-enabled applications may also be installed on the discovering UE 306). For example, the ProSe-enabled application may be a social networking application. The discoverable UE 302 and the discovering UE 306 have a "friend" relationship in the context of the ProSe-enabled application.

The discoverable UE 302 may send a request 310 for a temporary identifier to the network node 304. The request 310 may include a long-term identifier of the discoverable UE 302, for example, the application-layer identifier of the discoverable UE 302 that is used in connection with the ProSe-enabled application and the application server 308. The application-layer identifier may be a network access identifier such as username@domain.

For example, a person named Alice may use the discoverable UE 302 and may identify herself as alice@example.com to the ProSe-enabled application and thus to the application server 308. A person named Bob may use the discovering UE 306 and may include alice@example.com in his friend list at the ProSe-enabled application and thus at the application server 308.

For this example signaling diagram, the temporary identifier T-ID assigned to the discoverable UE 302 by the network node 304 is a temporary substitute (to be used in ProSe Discovery and/or in ProSe Communication) for the application-layer identifier of the discoverable UE 302 that is used in connection with the ProSe-enabled application and the application server 308. There is a one-to-one relationship between the temporary identifier T-ID and the application-layer identifier.

Responsive to receiving the request 310, the network node 304 may conduct an assignment and association process 312, in which the network node 304 assigns a temporary identifier T-ID to the discoverable UE 302 in an assignment, assigns an expiration value to the assignment, and associates the temporary identifier T-ID and the expiration value to the application-layer identifier. The network node 304 may maintain a database of valid assignments, and may add the association of the temporary identifier T-ID and the expiration value to the long-term identifier to the database. Once the expiration value has expired, the network node 304 may remove the association from the database of valid assignments.

The network node 304 may maintain a pool of unassigned temporary identifiers, which includes both temporary identifiers that have never been assigned to any discoverable UE and temporary identifiers that were previously assigned to a discoverable UE but that previous assignment is no longer valid. (In other words, once the expiration value assigned to an assignment has expired, the temporary identifier of that assignment is returned to the pool of unassigned temporary identifiers.) In this case, the network node 304 may assign the temporary identifier T-ID from the pool of unassigned temporary identifiers. Alternatively, the network node 304 may determine the temporary identifier T-ID from the application-layer identifier, using an algorithm.

The network node 304 may provide the temporary identifier T-ID and an indication of the expiration value to the discoverable UE 302 in a reply 314 to the request 310. Although the temporary identifier T-ID and the indication of the expiration value are illustrated as being provided in a single reply 314, as an alternative, the network node 304 may provide the temporary identifier T-ID to the discoverable UE 302 in a single reply and may provide the indication of the expiration value to the discoverable UE 302 in a separate reply.

Optionally, responsive to receiving the request, the network node 304 may conduct an authentication procedure 316 with the application server 308, in which the network node 304 provides the application server 308 with the application-layer identifier. The authentication procedure 316 may involve additional steps which are beyond the scope of this document. In this option, the network node 304 assigns the temporary identifier T-ID to the discoverable UE 302, assigns the expiration value, and associates the temporary identifier T-ID and the expiration value to the application-layer identifier responsive to success of the authentication procedure 316. If the authentication procedure 316 fails, then the network node 304 does not assign the temporary identifier T-ID to the discoverable UE 302.

The discovering UE 306 may send an inquiry 320 to the network node 304, where the inquiry 320 includes the application-layer identifier of the discoverable UE 302. Responsive to receiving the inquiry 320, the network node 304 may, at 322, look up the application-layer identifier in its database of valid assignments to retrieve its associated temporary identifier T-ID and its associated expiration value, and—optionally after checking with the application server 308 that the discovering UE 306 is permitted to contact the discoverable UE 302—may provide the temporary identifier T-ID and an indication of the expiration value to the discovering UE 306 in a reply 324 to the inquiry 320. Although the temporary identifier T-ID and the indication of the expiration value are illustrated as being provided in a single reply 324, as an alternative, the network node 304 may provide the temporary identifier T-ID to the discovering UE 306 in a single reply and may provide the indication of the expiration value to the discovering UE 306 in a separate reply. The discovering UE 306 may, at 326, associate internally the temporary identifier T-ID and the expiration value to the application-layer identifier of the discoverable UE 302. The expiration value provided to the discovering UE 306 expires at the same time as the expiration value provided to the discoverable UE 302. The inquiry 320 may be received by the network node 304 prior to, concurrent with, or after receipt of the request 310 by the network node 304. However, the reply 324 (or two replies, one with the temporary identifier T-ID and the other with the indication of the expiration value) cannot be sent by the network node 304 until after completion of the assignment and association process at 312.

The discoverable UE 302, used by Alice, may send a broadcast 330 of the temporary identifier T-ID, prior to expiry of the expiration value, in order to announce its identity. If the discovering UE 306, used by Bob, is within range of the discoverable UE 302, the discovering UE 306 may, responsive to receiving the broadcast 330, look up at 332 the application-layer identifier of the discoverable UE 302 that is internally associated to the broadcasted temporary identifier T-ID. Responsive to identifying the application-layer identifier, the discovering UE 306 may attempt to initiate communication 334 with the discoverable UE 302. For example, Bob may attempt to contact Alice through use of the ProSe-enabled applications at the discovering UE 306 and at the discoverable UE 302.

Figure 4:
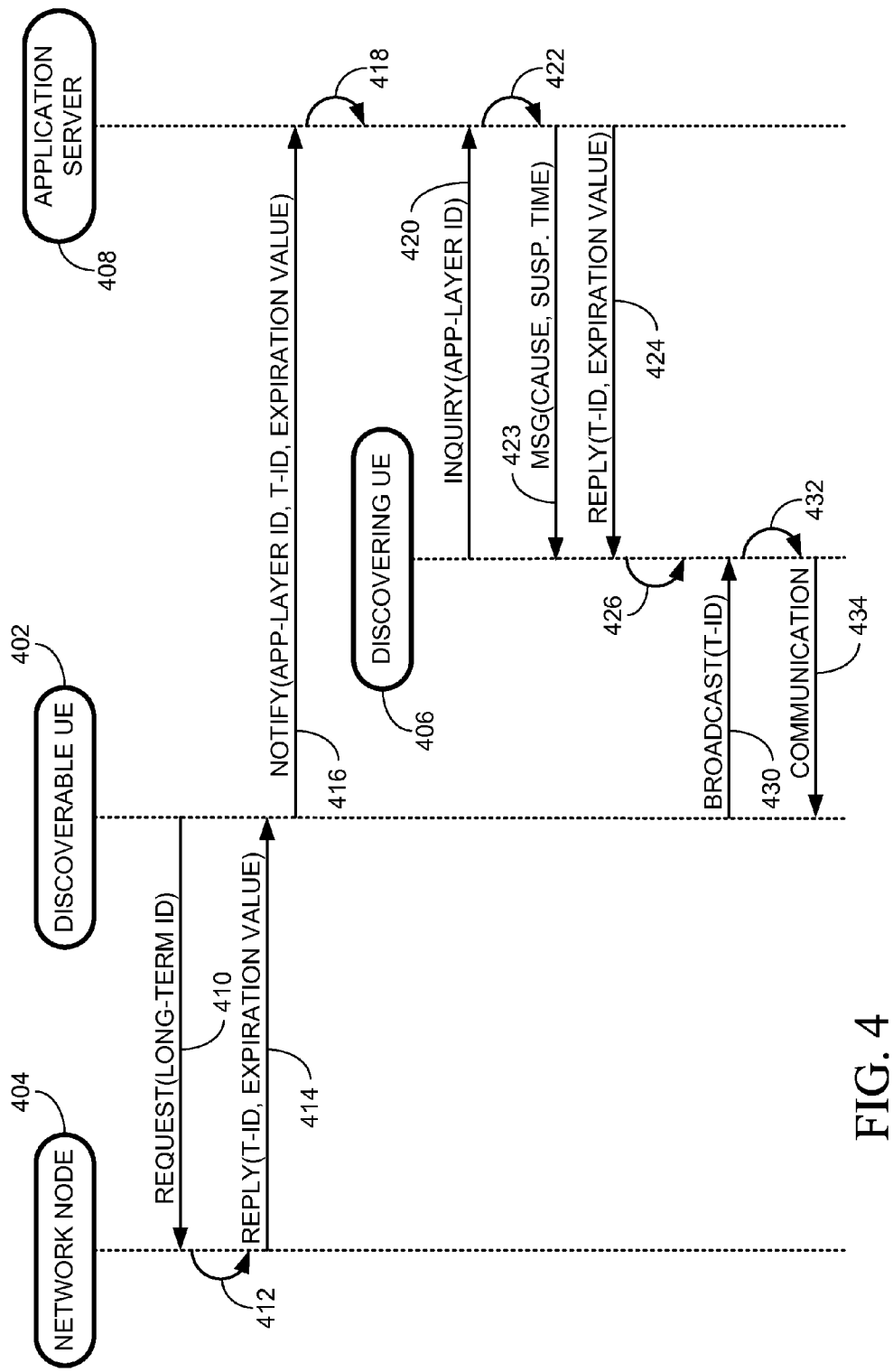
FIG. 4 is another example signaling diagram for facilitating discovery of a discoverable UE having installed thereon two or more ProSe-enabled applications.

FIG. 4 is an example signaling diagram involving a discoverable UE 402, a network node 404, a discovering UE 406, and an application server 408. The network node 404 is part of a ProSe-enabled Network, for example, a ProSe server, or an eNB, or a MME. The application server 408 may be operated by the operator of the ProSe-enabled Network or by a third-party service provider. For this example signaling diagram, the discoverable UE 402 has installed thereon two or more ProSe-enabled applications, including a particular ProSe-enabled application which discovers and connects with the application server 408, and the discovering UE 406 also has installed thereon the particular ProSe-enabled application that discovers and connects with the application server 408 (other ProSe-enabled applications may also be installed on the discovering UE 406). For example, the particular ProSe-enabled application may be a social networking application. The discoverable UE 402 and the discovering UE 406 have a "friend" relationship in the context of the particular ProSe-enabled application.

For example, a person named Carol may use the discoverable UE 402 and may identify herself as carol@example2.com to the particular ProSe-enabled application and thus to the application server 408. A person named Dave may use the discovering UE 406 and may include carol@example2.com in his friend list at the particular ProSe-enabled application and thus at the application server 408. Carol may identify herself as carolc@gmail.com to another ProSe-enabled application and to its application server (not shown).

The discoverable UE 402 may send a request 410 for a temporary identifier to the network node 404. The request 410 may include a long-term identifier of the discoverable UE 402, for example, a network identifier of the discoverable UE 402, such as an International Mobile Subscriber Identity (IMSI), or a permanent UE identifier of the discoverable UE 402, such as a BlackBerry® personal identification number (PIN).

For this example signaling diagram, the temporary identifier T-ID assigned to the discoverable UE 402 by the network node 404 is a temporary substitute (to be used in ProSe Discovery and/or in ProSe Communication) for all application-layer identifiers of the discoverable UE 402 that are used in connection with any ProSe-enabled application. There is a one-to-many relationship between the temporary identifier T-ID and the application-layer identifiers. For example, the temporary identifier T-ID is associated internally at the discoverable UE 402 both with the application-layer identifier carol@example2.com and with the application-layer identifier carolc@gmail.com.

Responsive to receiving the request 410, the network node 404 may conduct an assignment and association process 412, in which the network node 404 assigns a temporary identifier T-ID to the discoverable UE 402 in an assignment, assigns an expiration value to the assignment, and associates the temporary identifier T-ID and the expiration value to the long-term identifier. The network node 404 may maintain a database of valid assignments, and may add the association of the temporary identifier T-ID and the expiration value to the long-term identifier to the database. Once the expiration value has expired, the network node 404 may remove the association from the database of valid assignments.

The network node 404 may maintain a pool of unassigned temporary identifiers, which includes both temporary identifiers that have never been assigned to any discoverable UE and temporary identifiers that were previously assigned to a discoverable UE but that previous assignment is no longer valid. (In other words, once the expiration value assigned to an assignment has expired, the temporary identifier of that assignment is returned to the pool of unassigned temporary identifiers.) In this case, the network node 404 may assign the temporary identifier T-ID from the pool of unassigned temporary identifiers. Alternatively, the network node 404 may determine the temporary identifier T-ID from the long-term identifier, using an algorithm.

Prior to conducting the assignment and association process 412, the network node 404 may verify the authenticity of the long-term identifier received in the request 410. The details of this verification are beyond the scope of this document.

The network node 404 may provide the temporary identifier T-ID and an indication of the expiration value to the discoverable UE 402 in a reply 414 to the request 410. Although the temporary identifier T-ID and the indication of the expiration value are illustrated as being provided in a single reply 414, as an alternative, the network node 404 may provide the temporary identifier T-ID to the discoverable UE 402 in a single reply and may provide the indication of the expiration value to the discoverable UE 402 in a separate reply.

Responsive to receiving the temporary identifier T-ID and the indication of the expiration value, the discoverable UE 402 may provide the temporary identifier T-ID and an indication of the expiration value to the application server 408 in a notification 416. The notification 416 includes an application-layer identifier used by the discoverable UE 402 in the context of the particular ProSe-enabled application. Although the temporary identifier T-ID and the indication of the expiration value are illustrated as being provided in a single notification 416, as an alternative, the discoverable UE 402 may provide the temporary identifier T-ID and the application-layer identifier to the application server 408 in a single notification and may provide the indication of the expiration value and the application-layer identifier to the application server 408 in a separate notification. The application server 408 may, at 418, internally associate the temporary identifier T-ID and the expiration value to the application-layer identifier. The expiration value provided to the application server 408 expires at the same time as the expiration value provided to the discoverable UE 402.

Although not illustrated, the discoverable UE 402 may provide the temporary identifier T-ID and an indication of the expiration value, in notifications to other application servers (not shown) corresponding to the other ProSe-enabled applications installed on the discoverable UE 402. Each such notification includes the corresponding application-layer identifier of the discoverable UE 402 that is used in the context of the ProSe-enabled application. Those other application servers may internally associate the temporary T-ID and the expiration value to the appropriate application-layer identifier. The expiration value provided to the other application servers expires at the same time as the expiration value provided to the discoverable UE 402.

All application servers, including the application server 408, that have received the temporary identifier T-ID and an indication of the expiration value in notifications from the discoverable UE 402, may maintain a database of valid assignments.

The discovering UE 406 may send an inquiry 420 to the application server 408, where the inquiry includes the application-layer identifier of the discoverable UE 402 used in the context of the particular ProSe-enabled application. Responsive to receiving the inquiry 420, the application server 408 may, at 422, look up the application-layer identifier and its associated temporary identifier T-ID and its associated expiration value in its database of valid assignments, and—optionally after checking that the discovering UE 406 is permitted to contact the discoverable UE 402—may provide the temporary identifier T-ID and an indication of the expiration value to the discovering UE 406 in a reply 424 to the inquiry 420. Although the temporary identifier T-ID and the indication of the expiration value are illustrated as being provided in a single reply 424, as an alternative, the application server 408 may provide the temporary identifier T-ID to the discovering UE 406 in a single reply and may provide the indication of the expiration value to the discovering UE 406 in a separate reply. The discovering UE 406 may, at 426, associate internally the application-layer identifier of the discoverable UE 402 to the temporary identifier T-ID and to the expiration value. The expiration value provided to the discovering UE 406 expires at the same time as the expiration value provided to the discoverable UE 402. The inquiry 420 may be received by the application server 408 prior to, concurrent with, or after receipt of the notification 416 by the network node 404. However, the reply 424 (or two replies, one with the temporary identifier T-ID and the other with the indication of the expiration value) cannot be sent by the application server 408 until after the notification 416 is received and the internal association at 418 is completed.

The discoverable UE 402 may send a broadcast 430 of the temporary identifier T-ID, prior to expiry of the expiration value. If the discovering UE 406 is within range of the discoverable UE 402, the discovering UE 406 may, responsive to receiving the broadcast 430, look up at 432 the application-layer identifier of the discoverable UE 402 that is internally associated to the broadcasted temporary identifier T-ID. Responsive to identifying the long-term identifier, the discovering UE 406 may attempt to initiate communication 434 with the discoverable UE 402. For example, Dave may attempt to contact Carol through use of the particular ProSe-enabled applications at the discovering UE 406 and at the discoverable UE 402.

Any of the following signalling messages may be used by the network node 304 to send the reply 314 and/or to send the reply 324, or by the network node 404 to send the reply 414 and/or to send the reply 424:

an existing downlink (DL) Radio Resource Control (RRC) message with a new information element for the indication of the expiration value;

a new DL RRC message with an indication of the expiration value;

an existing Media Access Control (MAC) control element (CE) with an indication of the expiration value in reserved fields of the MAC CE;

a new MAC CE with an indication of the expiration value;

an existing System Information Block (SIB) with new information for an indication of the expiration value;

a new SIB with an indication of the expiration value;

a new Non-Access-Stratum (NAS) message over the control plane;

a new ProSe specific control message over the user plane.

Figure 5:
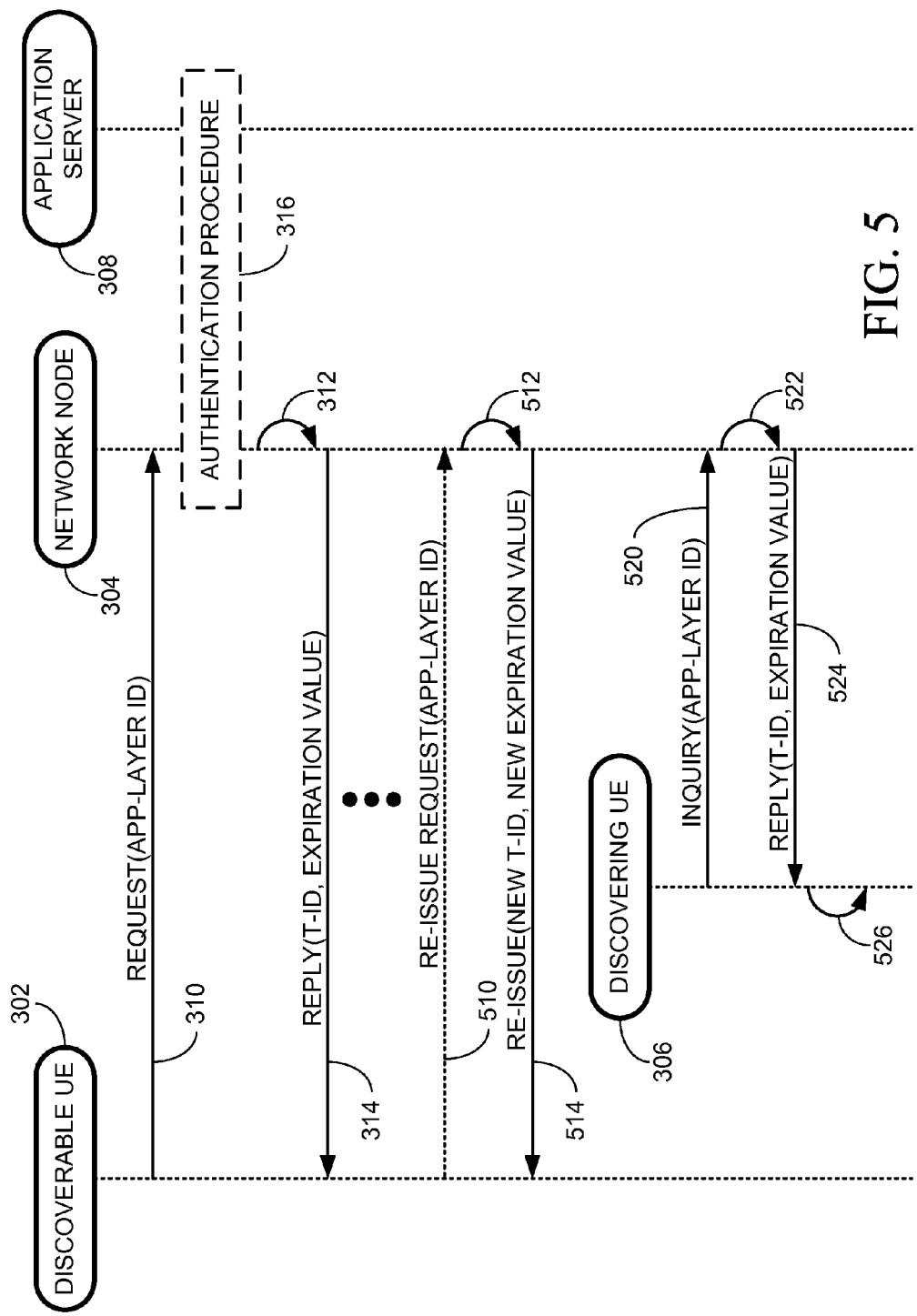
FIG. 5 is an example signaling diagram for assigning a new temporary identifier and a new expiration value to the discoverable UE of FIG. 3.

FIG. 5 is an example signaling diagram for assigning a new temporary identifier and a new expiration value to the discoverable UE 302 of FIG. 3. Sometime after the network node 304 has provided the temporary identifier T-ID and the indication of the expiration value to the discoverable UE 302 in the reply 314, the network node 304 evaluates a re-issue condition. If the re-issue condition is satisfied, the network node 304 may conduct another assignment and association process 512, in which the network node 304 assigns a new temporary identifier to the discoverable UE 302 in a new assignment, assigns a new expiration value to the new assignment, and associates the new temporary identifier and the new expiration value to the application-layer identifier. The network node 304 may provide the new temporary identifier and an indication of the new expiration value to the discoverable UE 302 in a re-issue 514. Although the new temporary identifier and the indication of the new expiration value are illustrated as being provided in a single re-issue 514, as an alternative, the network node 304 may provide the new temporary identifier to the discoverable UE 302 in a single reply and may provide the indication of the new expiration value to the discoverable UE 302 in a separate reply.

In one example, the re-issue condition may be expiry of a wake-up timer at the network node 304. The wake-up timer may be set to expire slightly earlier than the expiry of the previously assigned expiration value. Thus expiry of the wake-up timer triggers the network node 304 to conduct the assignment and association process 512 and to send the re-issue 514 to the discoverable UE 302.

In another example, the re-issue condition may be reception by the network node 304 of a re-issue request 510 from the discoverable UE 302. The discoverable UE 302 may send the re-issue request 510 prior to or after expiry of the previously assigned expiration value. For example, the discoverable UE 302 may set a wake-up timer to expire slightly earlier than the expiry of the previously assigned expiration value, and expiry of the wake-up timer triggers the discoverable UE 302 to send the re-issue request 510 to the network node 304.

In a further example, the re-issue condition may be reception of the re-issue request 510 and expiry of the wake-up timer.

The discovering UE 306 may send an inquiry 520 to the network node 304, where the inquiry 520 includes the application-layer identifier of the discoverable UE 302. If the inquiry 520 is received while more than one assignment of temporary identifier to the discoverable UE 302 is valid, the network node 304, when looking up the application-layer identifier in its database of valid assignments at 522, will retrieve two or more associated temporary identifiers and a corresponding two or more associated expiration values. The network node 304 may provide to the discovering UE 306 all retrieved temporary identifiers and an indication of all retrieved expiration values in a reply 524 to the inquiry 520. The discovering UE 306 may, at 526, internally associate all received temporary identifiers and all received expiration values to the application-layer identifier of the discoverable UE 302.

Figure 6:
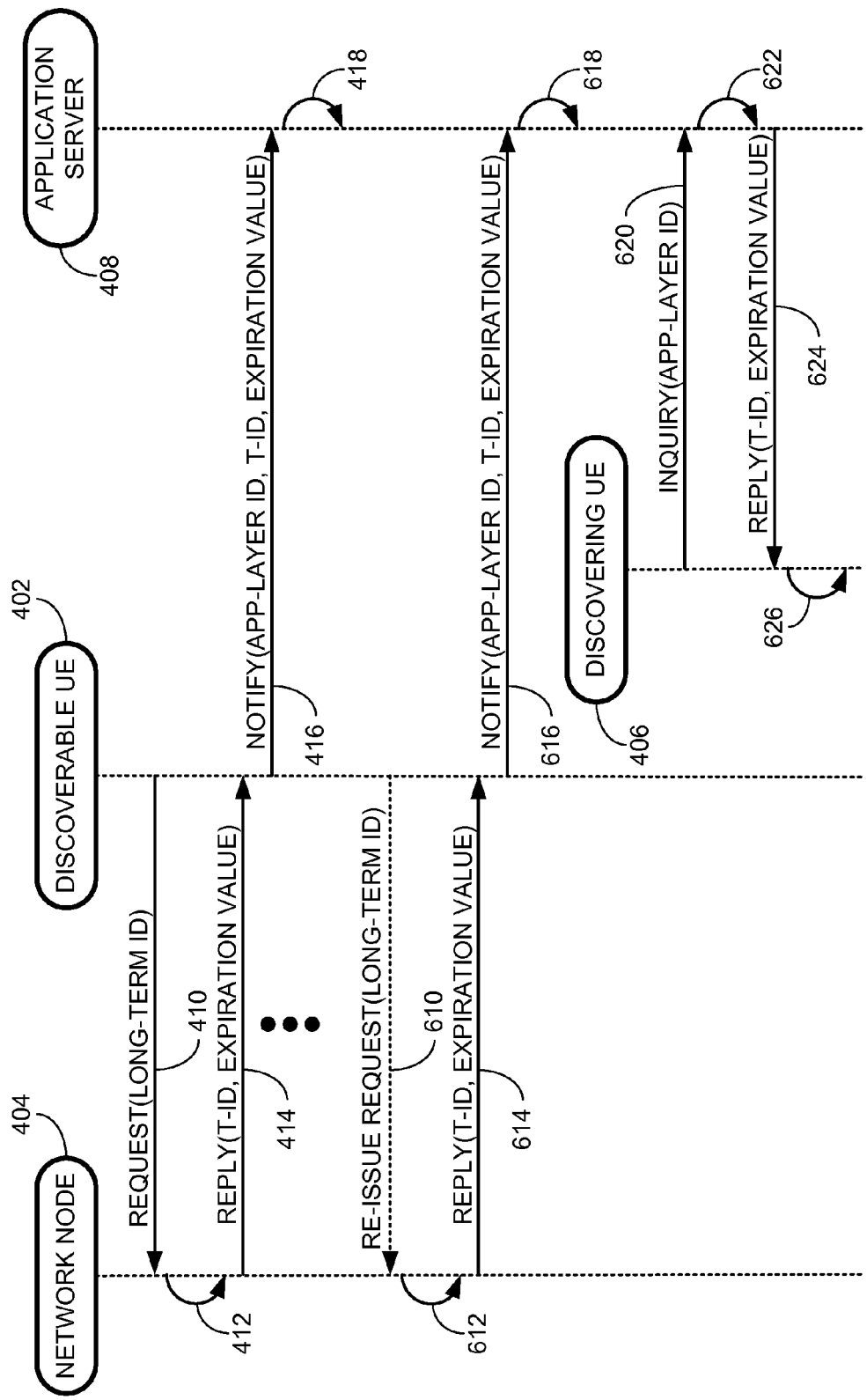
FIG. 6 is an example signaling diagram for assigning a new temporary identifier and a new expiration value to the discoverable UE of FIG. 4.

FIG. 6 is an example signaling diagram for assigning a new temporary identifier and a new expiration value to the discoverable UE 402 of FIG. 4. Sometime after the network node 404 has provided the temporary identifier T-ID and the indication of the expiration value to the discoverable UE 402 in the reply 414, the network node 404 evaluates a re-issue condition. If the re-issue condition is satisfied, the network node 404 may conduct another assignment and association process 612, in which the network node 404 assigns a new temporary identifier to the discoverable UE 402 in a new assignment, assigns a new expiration value to the new assignment, and associates the new temporary identifier and the new expiration value to the application-layer identifier. The network node 404 may provide the new temporary identifier and an indication of the new expiration value to the discoverable UE 402 in a re-issue 614. Although the new temporary identifier and the indication of the new expiration value are illustrated as being provided in a single re-issue 614, as an alternative, the network node 404 may provide the new temporary identifier to the discoverable UE 402 in a single reply and may provide the indication of the new expiration value to the discoverable UE 402 in a separate reply.

Responsive to receiving the new temporary identifier and the indication of the new expiration value, the discoverable UE 402 may provide the new temporary identifier and an indication of the new expiration value to the application server 408 in a notification 616. The notification 616 includes an application-layer identifier used by the discoverable UE 402 in the context of the particular ProSe-enabled application. Although the new temporary identifier and the indication of the new expiration value are illustrated as being provided in a single notification 616, as an alternative, the discoverable UE 402 may provide the new temporary identifier and the application-layer identifier to the application server 408 in a single notification and may provide the indication of the new expiration value and the application-layer identifier to the application server 408 in a separate notification. The application server 408 may, at 618, internally associate the new temporary identifier and the new expiration value to the application-layer identifier. The new expiration value provided to the application server 408 expires at the same time as the new expiration value provided to the discoverable UE 402.

In one example, the re-issue condition may be expiry of a wake-up timer at the network node 404. The wake-up timer may be set to expire slightly earlier than the expiry of the previously assigned expiration value. Thus expiry of the wake-up timer triggers the network node to conduct the assignment and association process 612 and to send the re-issue 614 to the discoverable UE 402.

In another example, the re-issue condition may be reception by the network node 404 of a re-issue request 610 from the discoverable UE 402. The discoverable UE 402 may send the re-issue request 610 prior to or after expiry of the previously assigned expiration value. For example, the discoverable UE 402 may set a wake-up timer to expire slightly earlier than the expiry of the previously assigned expiration value, and expiry of the wake-up timer triggers the discoverable UE 402 to send the re-issue request 610 to the network node 404.

In a further example, the re-issue condition may be reception of the re-issue request 610 and expiry of the wake-up timer.

The discovering UE 406 may send an inquiry 620 to the application server 408, where the inquiry 620 includes the application-layer identifier of the discoverable UE 402. If the inquiry 620 is received while more than one assignment of temporary identifier to the discoverable UE 402 is valid, the application server 408, when looking up the application-layer identifier in its database of valid assignments at 622 will retrieve two or more associated temporary identifiers and a corresponding two or more associated expiration values. The application server 408 may provide to the discovering UE 406 all retrieved temporary identifiers and an indication of all retrieved expiration values in a reply 624 to the inquiry 620. The discovering UE 406 may, at 626, internally associate all received temporary identifiers and all received expiration values to the application-layer identifier of the discoverable UE 402.

Figure 7:
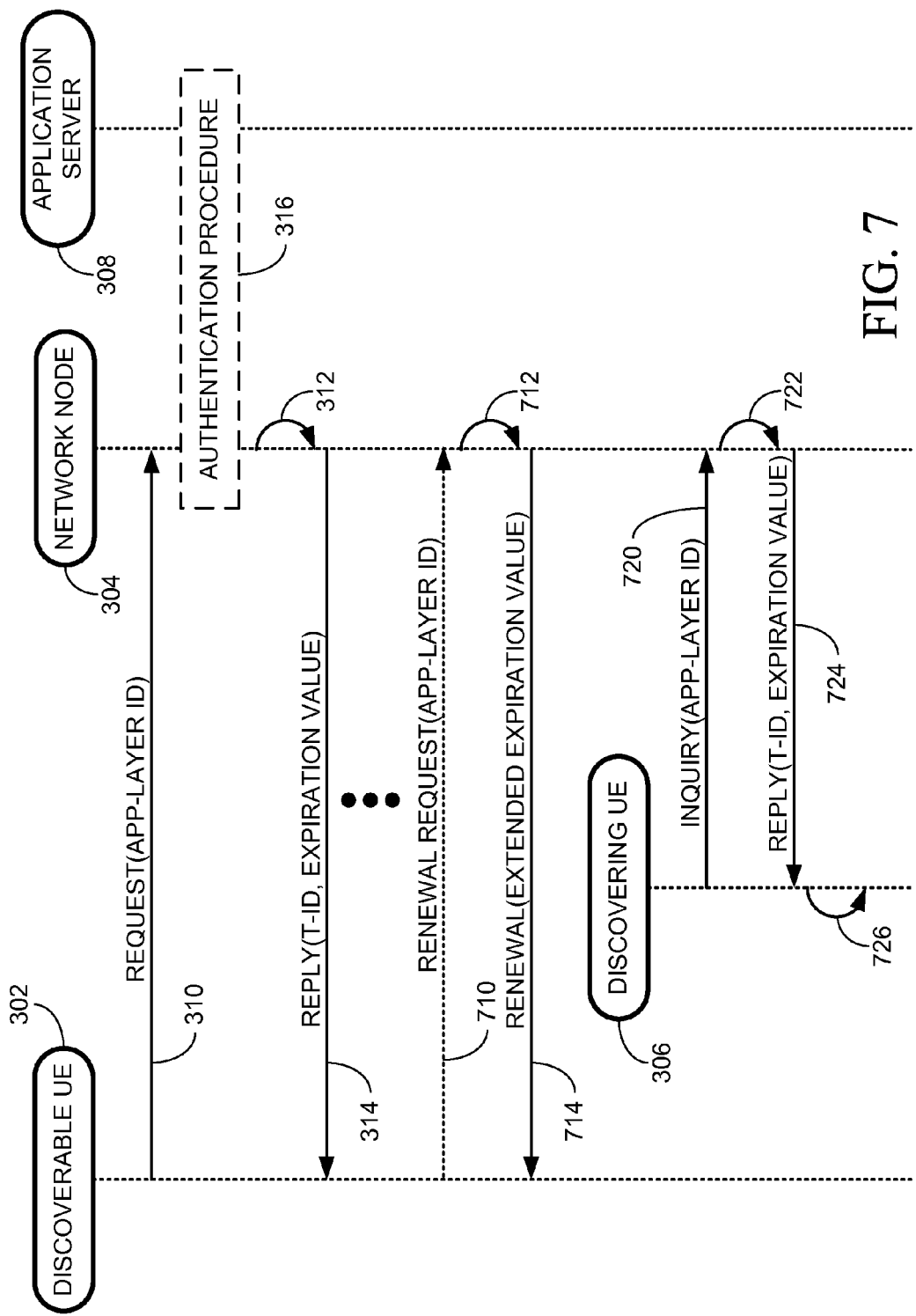
FIG. 7 is an example signaling diagram for renewing a temporary identifier assigned to the discoverable UE of FIG. 3.

FIG. 7 is an example signaling diagram for renewing a temporary identifier assigned to the discoverable UE 302 of FIG. 3. Sometime after the network node 304 has provided the temporary identifier T-ID and the indication of the expiration value to the discoverable UE 302 in the reply 314, the network node 304 evaluates a renewal condition. If the renewal condition is satisfied, the network node 304 may conduct a modified assignment and association process 712, in which the network node 304 extends the expiration value assigned to the assignment, and updates the association of the temporary identifier and the extended expiration value to the application-layer identifier. The network node 304 may provide an indication of the extended expiration value to the discoverable UE 302 in a renewal 714.

In one example, the renewal condition may be expiry of a wake-up timer at the network node 304. The wake-up timer may be set to expire slightly earlier than the expiry of the previously assigned expiration value. Thus expiry of the wake-up timer triggers the network node 304 to conduct the modified assignment and association process 712 and to send the renewal 714 to the discoverable UE 302.

In another example, the renewal condition may be reception by the network node 304 of a renewal request 710 from the discoverable UE 302. The discoverable UE 302 may send the renewal request 710 prior to or after expiry of the previously assigned expiration value.

In a further example, the renewal condition may be reception of the renewal request 710 and expiry of the wake-up timer.

The discovering UE 306 may send an inquiry 720 to the network node 304, where the inquiry 720 includes the application-layer identifier of the discoverable UE 302. If the inquiry 720 is received after the extended expiration time has been assigned, the network node 304, when looking up the application-layer identifier in its database of valid assignments at 722 will retrieve the associated temporary identifier and the associated extended expiration value. The network node 304 may provide to the discovering UE 306 the retrieved temporary identifier and an indication of the retrieved extended expiration value in a reply 724 to the inquiry 520. The discovering UE 306 may, at 726, internally associate the temporary identifier and the extended expiration value to the application-layer identifier of the discoverable UE 302.

Figure 8:
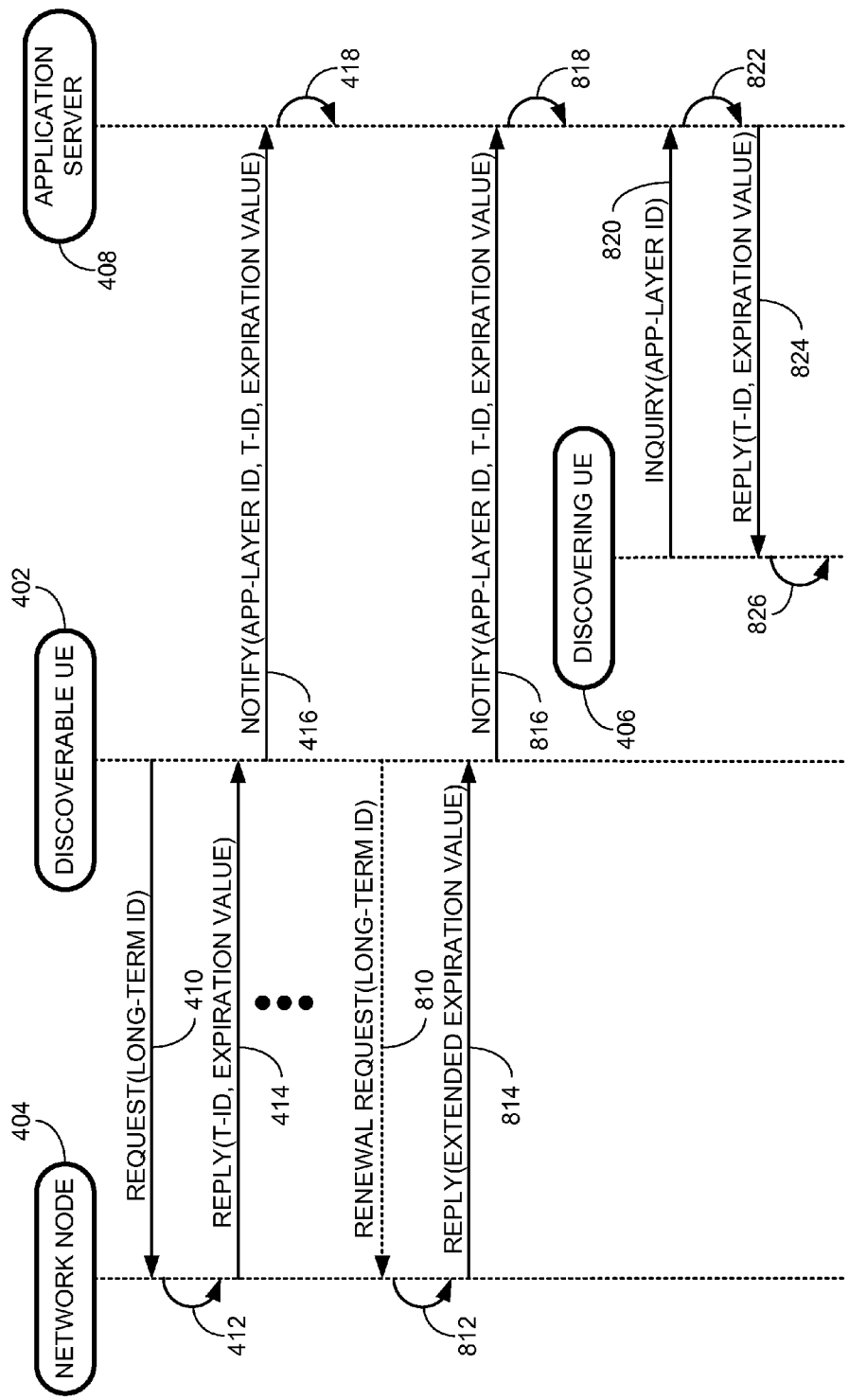
FIG. 8 is an example signaling diagram for renewing a temporary identifier assigned to the discoverable UE of FIG. 4.

FIG. 8 is an example signaling diagram for renewing a temporary identifier assigned to the discoverable UE 402 of FIG. 4. Sometime after the network node 404 has provided the temporary identifier T-ID and the indication of the expiration value to the discoverable UE 402 in the reply 414, the network node 404 evaluates a renewal condition. If the renewal condition is satisfied, the network node 404 may conduct a modified assignment and association process 812, in which the network node 404 extends the expiration value assigned to the assignment, and updates the association of the temporary identifier and the extended expiration value to the application-layer identifier. The network node 404 may provide an indication of the extended expiration value to the discoverable UE 402 in a renewal 814.

Responsive to receiving the indication of the extended expiration value, the discoverable UE 402 may provide an indication of the extended expiration value to the application server 408 in a notification 816. The notification 816 includes an application-layer identifier used by the discoverable UE 402 in the context of the particular ProSe-enabled application. The application server 408 may, at 818, update its internal association of the temporary identifier and the extended expiration value to the application-layer identifier. The extended expiration value provided to the application server 408 expires at the same time as the extended expiration value provided to the discoverable UE 402.

In one example, the renewal condition may be expiry of a wake-up timer at the network node 404. The wake-up timer may be set to expire slightly earlier than the expiry of the previously assigned expiration value. Thus expiry of the wake-up timer triggers the network node to conduct the modified assignment and association process 812 and to send the renewal 814 to the discoverable UE 402.

In another example, the renewal condition may be reception by the network node 404 of a renewal request 810 from the discoverable UE 402. The discoverable UE 402 may send the renewal request 810 prior to or after expiry of the previously assigned expiration value.

In a further example, the renewal condition may be reception of the renewal request 810 and expiry of the wake-up timer.

The discovering UE 406 may send an inquiry 820 to the application server 408, where the inquiry 820 includes the application-layer identifier of the discoverable UE 402. If the inquiry 820 is received after the application server 408 has been notified of the extended expiration time, the application server 408, when looking up the application-layer identifier in its database of valid assignments at 822 will retrieve the associated temporary identifier and the associated extended expiration value. The application server 408 may provide to the discovering UE 406 the retrieved temporary identifier and an indication of the retrieved extended expiration value in a reply 824 to the inquiry 820. The discovering UE 406 may, at 826, internally associate the temporary identifier and the extended expiration value to the application-layer identifier of the discoverable UE 402.

Returning now to FIG. 3, it is possible that when the network node 304 receives the inquiry 320 from the discovering UE 306, the network node 304 does not have any valid assignment of a temporary identifier to the application-layer identifier included in the inquiry 320, and therefore the look up performed at 322 will not find any temporary identifier and expiration value associated to the application-layer identifier in the database of valid assignments. There may be different reasons for the lack of a valid assignment. The network node 304, responsive to receiving the inquiry 320, may respond with a message 323 that includes a cause value indicative of the reason for not responding with a reply including a temporary identifier and an expiration value.

TABLE 1

| Cause Value | Meaning |
|---|---|
| 0 | No ProSe services |
| 1 | Discoverable UE has not requested temporary identifier |
| 2 | Discoverable UE has requested temporary identifier, but does not have valid assignment |

For example, the network node 304 may not allow ProSe services with the discoverable UE 302, and therefore may indicate a cause value of 0. Responsive to receiving the message 323 with the cause value 0, the discovering UE 306 may drop ProSe services. In another example, the network node 304 may allow ProSe services with the discoverable UE 302, but the discoverable UE 302 may not yet have requested a temporary identifier from the network node 304, and therefore may indicate a cause value of 1. In yet another example, the network node 304 may allow ProSe services with the discoverable UE 302 and the discoverable UE 302 may have previously requested a temporary identifier from the network node 304, but no valid assignment currently exists, and therefore the network node 304 may indicate a cause value of 2. Responsive to receiving the message 323 with the cause value 1 or with the cause value 2, the discovering UE 306 may wait for ProSe services.

The network node 304 may maintain records of inquiries for which messages with cause values have been sent. Once the discoverable UE 302 has requested a temporary identifier and the network node 304 has assigned a temporary identifier T-ID to the discoverable UE 302 and has assigned an expiration value to the assignment and has associated the application-layer identifier of the discoverable UE 302 to the temporary identifier T-ID and to the expiration value, the network node 304 may provide the temporary identifier T-ID and an indication of the expiration value to the discovering UE 306 in the reply 324 (or in two replies, one with the temporary identifier T-ID and the other with the expiration value), without waiting for a further inquiry from the discovering UE 306.

The message 323 may include, instead of a cause value, an indication of a suspension time. A suspension time indicates a minimum period of time that must elapse until the discoverable UE 302 is allowed ProSe services. The suspension time may be provided in seconds, or alternatively, in units of subframes or frames.

TABLE 2

| Suspension Time | Meaning |
| --- | --- |
| 0000 | No ProSe services |
| 0001-1111 | Discoverable UE has not requested temporary identifier |

For example, responsive to receiving the message 323 with the suspension time '0000', the discovering UE 306 may drop ProSe services, because the suspension time '0000' indicates that the network cannot allow ProSe services with the discoverable UE 302. In another example, responsive to receiving the message 323 with a suspension time that is not '0000', the discovering UE 306 may wait, in anticipation of receiving the temporary identifier T-ID and the expiration value in the reply 324 (or in two replies, one with the temporary identifier T-ID and the other with the expiration value) once the non-zero suspension time has elapsed.

The message 323 may include both a cause value and an indication of a suspension time. For example, for cause value 1 or 2, the network node 304 may indicate any specific suspension time to the discovering UE 306 with the cause value. For example, if the cause value is 1 and the suspension time is '0001' (e.g. 1 second), the discovering UE 306 may receive the reply 324 (or two replies) with the temporary identifier T-ID and the expiration value from the network node 304 after 1 second has elapsed.

Returning now to FIG. 4, it is possible that when the application server 408 receives the inquiry 420 from the discovering UE 406, the application server 408 does not have any valid assignment of a temporary identifier to the application-layer identifier included in the inquiry 420, and therefore the look up performed at 422 will not find any temporary identifier and expiration value associated to the application-layer identifier in the database of valid assignments. There may be different reasons for the lack of a valid assignment. The application server 408, responsive to receiving the inquiry 420, may respond with a message 423 that includes a cause value indicative of the reason for not responding with a reply including a temporary identifier and an expiration value. Example cause values 0, 1, 2 and their meanings are provided above in Table 1.

For example, the application server 408 may not allow ProSe services with the discoverable UE 402, and therefore may indicate a cause value of 0. Responsive to receiving the message 423 with the cause value 0, the discovering UE 406 may drop ProSe services. In another example, the application server 408 may allow ProSe services with the discoverable UE 402, but the discoverable UE 402 may not yet have notified the application server 408 of any temporary identifier, and therefore may indicate a cause value of 1. In yet another example, the application server 408 may allow ProSe services with the discoverable UE 402 and the discoverable UE 402 may have previously notified the application server 408 of a temporary identifier, but no valid assignment currently exists, and therefore the application server 408 may indicate a cause value of 2. Responsive to receiving the message 423 with the cause value 1 or with the cause value 2, the discovering UE 406 may wait for ProSe services.

The application server 408 may maintain records of inquiries for which messages with cause values have been sent. Once the discoverable UE 402 has notified the application server 408 of a newly assigned temporary identifier T-ID and of the expiration value assigned to the assignment, the application server 408 may provide the temporary identifier T-ID and an indication of the expiration value to the discovering UE 406 in the reply 424 (or in two replies, one with the temporary identifier T-ID and the other with the expiration value), without waiting for a further inquiry from the discovering UE 406.

The message 423 may include, instead of a cause value, an indication of a suspension time. A suspension time indicates a minimum period of time that must elapse until the discoverable UE 402 is allowed ProSe services. The suspension time may be provided in seconds, or alternatively, in units of subframes or frames. Example suspension times and their meanings are provided above in Table 2.

For example, responsive to receiving the message 423 with the suspension time '0000', the discovering UE 406 may drop ProSe services, because the suspension time '0000' indicates that the application server 408 cannot allow ProSe services with the discoverable UE 402. In another example, responsive to receiving the message 423 with a suspension time that is not '0000', the discovering UE 406 may wait, in anticipation of receiving the temporary identifier T-ID and the expiration value in the reply 424 (or in two replies, one with the temporary identifier T-ID and the other with the expiration value) once the non-zero suspension time has elapsed.

The message 423 may include both a cause value and an indication of a suspension time. For example, for cause value 1 or 2, the application server 408 may indicate any specific suspension time to the discovering UE 406 with the cause value. For example, if the cause value is 1 and the suspension time is '0001' (e.g. 1 second), the discovering UE 406 may receive the reply 424 (or two replies) with the temporary identifier T-ID and the expiration value from the application server 408 after 1 second has elapsed.

Any of the following signalling messages may be used by the network node 304 to send the message 323, or by the application server 408 to send the message 423:
    an existing downlink (DL) Radio Resource Control (RRC) message with a new information element for the cause value and/or the indication of the suspension time;
    a new DL RRC message with the cause value and/or the indication of the suspension time;

an existing Media Access Control (MAC) control element (CE) with the cause value and/or the indication of the suspension time in reserved fields of the MAC CE;

a new MAC CE with the cause value and/or the indication of the suspension time;

an existing System Information Block (SIB) with new information for the cause value and/or the indication of the suspension time;

a new SIB with the cause value and/or the indication of the suspension time;

a new Non-Access-Stratum (NAS) message over the control plane;

a new ProSe specific control message over the user plane

Figure 9:
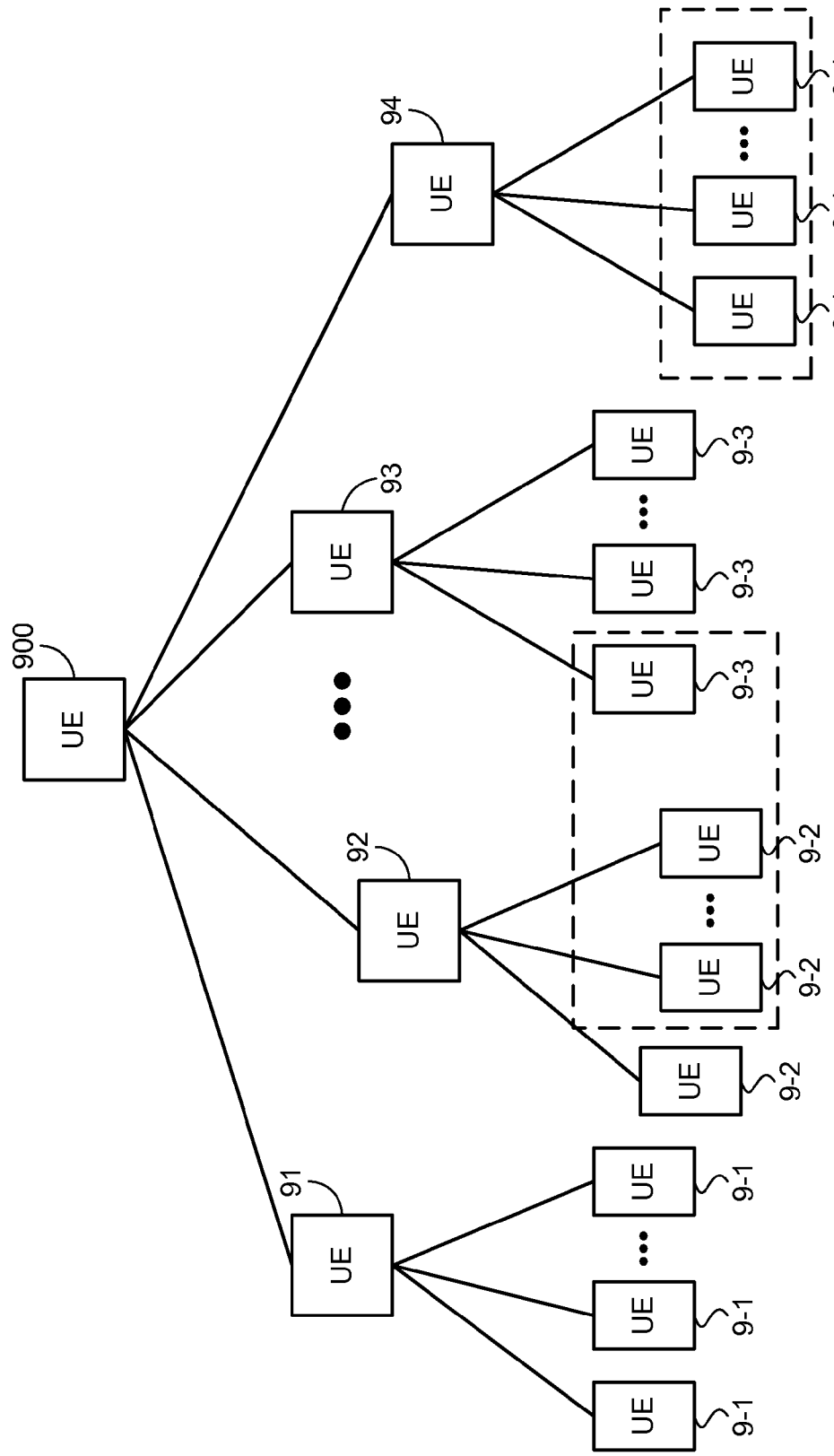
FIG. 9 is an illustration of an example UE hierarchy.

FIG. 9 is an illustration of an example UE hierarchy. Solely for the purpose of illustration, there are three classes in this example hierarchy, however the number of classes may be two or may be greater than three. In this example hierarchy, UEs 9-1, UEs 9-2, UEs 9-3, and UEs 9-4 are of the lowest class, for example, used by firefighters at four different fire stations. In this example hierarchy, UE 91, UE 92, UE 93 and UE 94 are of the middle class, for example, used by the respective heads of the four fire stations, all of which report to a regional headquarters of the fire department. In this example hierarchy, a UE 900 is of the highest class, for example, used by the head of the regional headquarters.

This document proposes that each UE in the hierarchy (except for UEs of the lowest class) is authorized to issue temporary identifiers to UEs of a lower class in the hierarchy. This document also proposes that a UE may issue a temporary identifier to itself when there is no higher-class authorized issuer available. In order to avoid potential collision between the temporary identifiers assigned by different authorized issuers, each authorized issuer maintains its own pool of temporary identifiers, which is different from the pool of the other authorized issuers. Each temporary identifier in the pool for a particular authorized issuer may contain an indication of the class of that particular authorized issuer. With this approach, a temporary identifier reveals which authorized issuer the UE belongs to. This may raise a privacy concern. Alternatively, an authorized issuer contacts the higher authorized issuer (most likely the highest authorized issuer, which is the server) and refreshes the temporary identifier pool by returning all the temporary identifiers to the higher authorized issuer and getting new temporary identifiers from the higher authorized issuer. This may be done when none of the temporary identifiers is issued to any UE. The higher authorized issuer may refrain from allocating/issuing a temporary identifier to any lower authorized issuer or UE while the temporary identifier is allocated to a lower authorized issuer in order to prevent a potential temporary identifier collision. By doing this, an authorized issuer maintains a completely random pool of temporary identifiers, which guarantees the privacy of the UE for which a temporary identifier is issued.

For example, the UE 900 is authorized to issue temporary identifiers for all members of the hierarchy, including the UEs belonging to the heads of the fire stations. The UE 91 is authorized to issue temporary identifiers for the UEs 9-1 belonging to all firefighters at the first fire station. The UE 92 is authorized to issue temporary identifiers for the UEs 9-2 belonging to the firefighters at the second fire station. The UE 93 is authorized to issue temporary identifiers for the UEs 9-3 belonging to the firefighters at the third fire station. The UE 94 is authorized to issue temporary identifiers for the UEs 9-4 belonging to the firefighters at the fourth fire station. In the absence of the UE 900, the UE 91, the UE 92, the UE 93 and the UE 94 are authorized to issue temporary identifiers to themselves.

Figure 10:
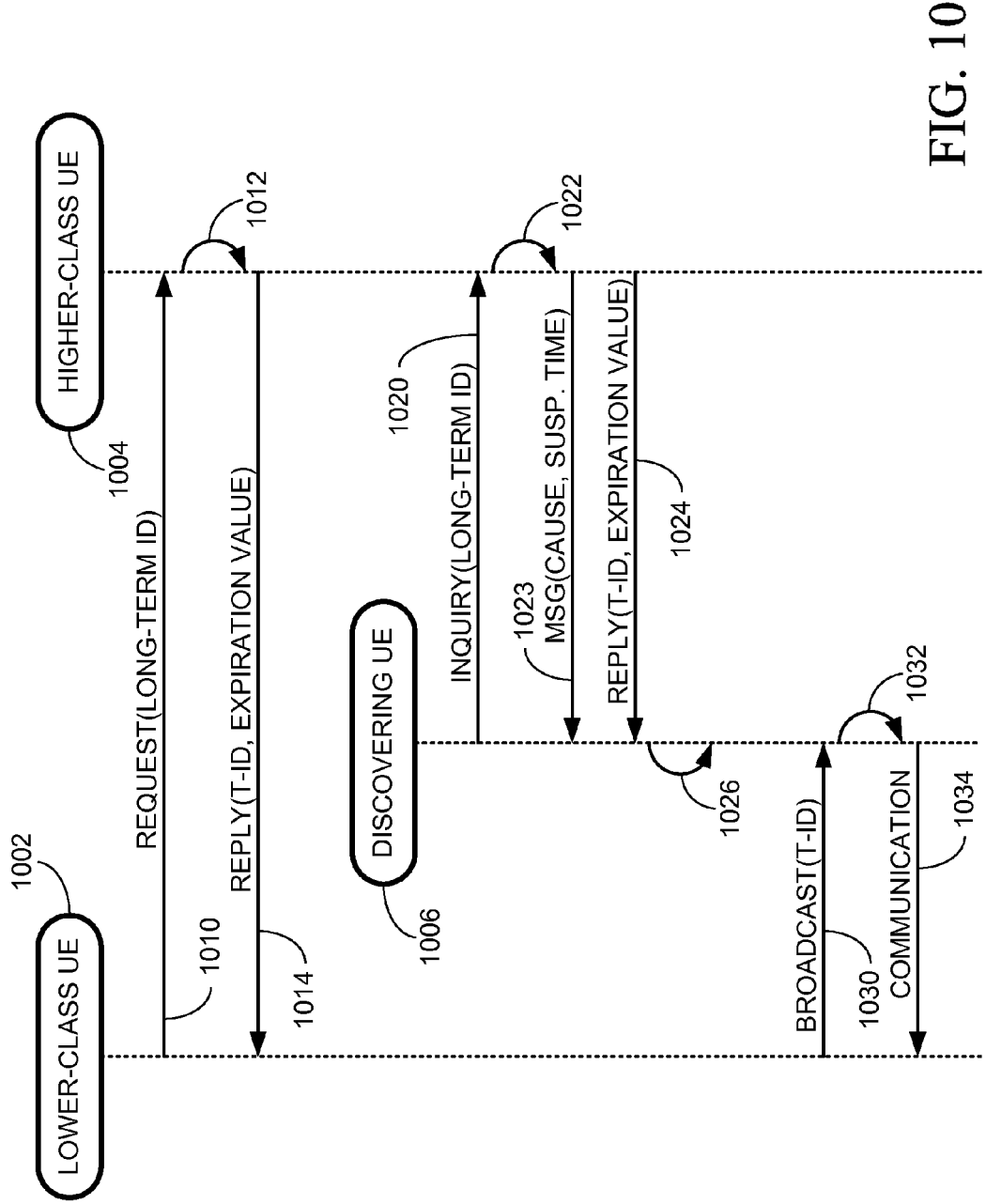
FIG. 10 is an example signaling diagram for facilitating discovery of a lower class UE.

FIG. 10 is an example signaling diagram involving a discoverable lower-class UE 1002, a higher-class UE 1004, and a discovering UE 1006 (of any class). The lower-class UE 1002, the higher-class UE 1004 and the UE 1006 all belong to the same hierarchy. It is assumed in this example that the lower-class UE 1002 does not have a valid temporary identifier T-ID.

The lower-class UE 1002 may send a request 1010 for a temporary identifier to the higher-class UE 1004. The request 1010 may include a long-term identifier of the lower-class UE 1002, for example, a permanent identifier of the lower-class UE 1002. Optionally, the request 1010 may include credential information of the lower-class UE 1002 so that the higher-class UE 1004 can authenticate the lower-class UE 1002.

For this example signaling diagram, the temporary identifier T-ID assigned to the lower-class UE 1002 by the higher-class UE 1004 is a temporary substitute (to be used in ProSe Discovery and/or in ProSe Communication) for the long-term identifier of the lower-class UE 1002. There is a one-to-one relationship between the temporary identifier T-ID and the long-term identifier.

Responsive to receiving the request 1010, the higher-class UE 1004 may conduct an assignment and association process 1012, in which the higher-class UE 1004 assigns a temporary identifier T-ID to the lower-class UE 1002 in an assignment, assigns an expiration value to the assignment, and associates the temporary identifier T-ID and the expiration value to the long-term identifier. The higher-class UE 1004 may maintain a database of valid assignments, and may add the association of the temporary identifier T-ID and the expiration value to the long-term identifier to the database. Once the expiration value has expired, the higher-class UE 1004 may remove the association from the database of valid assignments.

The higher-class UE 1004 may maintain a pool of unassigned temporary identifiers, which includes both temporary identifiers that have never been assigned to any discoverable UE and temporary identifiers that were previously assigned to a lower-class UE (or to itself) but that previous assignment is no longer valid. (In other words, once the expiration value assigned to an assignment has expired, the temporary identifier of that assignment is returned to the pool of unassigned temporary identifiers.) In this case, the higher-class UE 1004 may assign the temporary identifier T-ID from the pool of unassigned temporary identifiers. Alternatively, the higher-class UE 1004 may determine the temporary identifier T-ID from the long-term identifier, using an algorithm.

The higher-class UE 1004 may provide the temporary identifier T-ID and an indication of the expiration value to the lower-class UE 1002 in a reply 1014 to the request 1010. Although the temporary identifier T-ID and the indication of the expiration value are illustrated as being provided in a single reply 1014, as an alternative, the higher-class UE 1004 may provide the temporary identifier T-ID to the lower-class UE 1002 in a single reply and may provide the indication of the expiration value to the lower-class UE 1002 in a separate reply.

The discovering UE 1006 may send an inquiry 1020 to the higher-class UE 1004, where the inquiry 1020 includes the long-term identifier of the lower-class UE 1002. Responsive to receiving the inquiry 1020, the higher-class UE 1004 may, at 1022, look up the long-term identifier in its database of valid assignments to retrieve its associated temporary identifier T-ID and its associated expiration value, and—optionally after checking that the discovering UE 1006 is permitted to contact the lower-class UE 1002—may provide the temporary identifier T-ID and an indication of the expiration value to the discovering UE 1006 in a reply 1024 to the inquiry 1020. Although the temporary identifier T-ID and the indication of the expiration value are illustrated as being provided in a single reply 1024, as an alternative, the higher-class UE 1004 may provide the temporary identifier T-ID to the discovering UE 1006 in a single reply and may provide the indication of the expiration value to the discovering UE 1006 in a separate reply. The discovering UE 1006 may, at 1026, associate internally the temporary identifier T-ID and the expiration value to the long-term identifier of the lower-class UE 1002. The expiration value provided to the discovering UE 1006 expires at the same time as the expiration value provided to the lower-class UE 1002. The inquiry 1020 may be received by the higher-class UE 1004 prior to, concurrent with, or after receipt of the request 1010 by the higher-class UE 1004. However, the reply 1024 (or two replies, one with the temporary identifier T-ID and the other with the indication of the expiration value) cannot be sent by the higher-class UE 1004 until after completion of the assignment and association process at 1012.

The lower-class UE 1002 may send a broadcast 1030 of the temporary identifier T-ID, prior to expiry of the expiration value, in order to announce its identity. If the discovering UE 1006 is within range of the lower-class UE 1002, the discovering UE 1006 may, responsive to receiving the broadcast 1030, look up at 1032 the long-term identifier of the lower-class UE 1002 that is internally associated to the broadcasted temporary identifier T-ID. Responsive to identifying the long-term identifier, the discovering UE 1006 may attempt to initiate communication 1034 with the lower-class UE 1002.

A UE reports its previous temporary identifier and the assigned expiration value to the highest class authorized issuer among the available authorized issuers whenever the UE determines that a new highest class authorized issuer becomes available. The new highest class authorized issuer could have higher-class than the previous authorized issuer or have lower-class than the previous authorized issuer. For example, if a UE x moves from in-coverage, where the authorized issuer is the network node (who has the highest class among all the authorized issuers), to out-of-coverage, where the head of the fire station is the highest available authorized issuer, the UE x reports the network-assigned temporary identifier and the corresponding assigned expiration value along with the long-term identifier of the UE x to the head of the fire station. Optionally, the report from the UE x includes the identity of the issuer who issued the previous temporary identifier, and optionally, the report from the UE x includes credential information of the UE x. Responsive to receiving the assigned temporary identifier, the corresponding assigned expiration value, and the long-term identifier, the head of the fire station may perform one of the following acts:

(a) If the head of the fire station is aware of any available higher authorized issuer, for example, the head of the regional headquarters, the head of the regional fire station forwards the report message from the UE x to the head of the regional headquarters. Even if the head of the fire station is aware of an available higher authorized issuer, the head of the fire station may perform (b) or (c) based on policy or configuration.

(b) If the assignment of the received temporary identifier is determined to be valid (e.g., because its expiration value has not yet expired and the previous issuer is trustworthy), the head of the fire station may store the received temporary identifier, expiration value, and long-term identifier. In this case, the head of the fire station may respond to the UE x with acknowledgement. The UE x may record the head of the fire station as the current authorized issuer. The head of the fire station may provide this information to any of the "friends" of the UE x whenever the friend requests the temporary identifier of the UE x.

(c) If the assignment of the received temporary identifier is no longer valid (e.g., because the previous issuer is not trustworthy), the head of the fire station may assign, from its available pool, a new temporary identifier to the UE x in a new assignment and may assign a new expiration value to the new assignment. The head of the fire station may store the new temporary identifier, the new expiration value, and the long-term identifier. The head of the fire station may respond to the UE x with a message including new temporary identifier, an indication of the new expiration value. Responsive to receiving the new temporary identifier, an indication of the new expiration value from a new issuer (in this case, the head of the fire station), the UE x may abandon the previously assigned temporary identifier and use the new temporary identifier from that point in time. The UE x records the head of the fire station as the current authorized issuer. The head of the fire station may provide the new temporary identifier and an indication of the new expiration value to any of the "friends" of the UE x whenever the friend requests the temporary identifier of the UE x.

If the UE x discovers any higher class authorized issuer for the UE x than the current authorized issuer, the UE x may report its currently assigned temporary identifier, the associated expiration time and its long-term identifier to the new highest class authorized issuer. Responsive to receiving the report message, the new highest authorized issuer may perform one of the acts (a), (b), (c) described above. The new highest authorized issuer may determine the class of the previous issuer based on the temporary identifier in the case that the temporary identifier contains the class information of its issuer. Alternatively, the UE x may provide the class or even identity of the previous issuer explicitly in the report message.

When an authorized issuer A is aware of any of the available higher-class authorized issuers in the hierarchy, the authorized issuer A may provide a record for the temporary identifier that the authorized issuer A issued, an indication of the expiration value and associated long-term identifier to the available higher-class authorized issuer. This may be done right after the authorized issuer A performs a temporary identifier assignment to a lower-class UE x if the higher-class authorized issuer is available.

Suppose two authorized issuers A and B belong to the same hierarchy. The class of the authorized issuer A is lower than that of the authorized issuer B. All the UEs to whom the authorized issuer A is eligible to issue a temporary identifier are denoted by a group G. When two authorized issuers A and B become available to each other after being unavailable for a while, two authorized issuers A and B exchange the stored records of temporary identifiers, indications of the expiration value and associated long-term identifiers of the UEs in the group G. This can be achieved via friend's temporary identifier inquiries. The authorized issuer A inquires to the authorized issuer B the temporary identifiers of the UEs in group G whose temporary identifier is unknown to the authorized issuer A. The authorized issuer B inquires to the authorized issuer A the temporary identifiers of the UEs in group G whose temporary identifier is unknown to the authorized issuer B.

When a UE y retrieves temporary identifiers for its friends, the UE y may use a group identifier instead of a list of individual friends. This may be useful when the UE y is not fully aware of all members of the group, but is authorized and required to communicate with group members. For example, suppose a firefighter from a first fire station A is on a rescue operation. Firefighters from a number of fire stations may be on duty for the rescue operation. Even if the firefighter from the first fire station A does not know all the firefighters from other fire stations, he/she is required to communicate with the other firefighters. In this case, the firefighter may use "Firefighters from fire station B" or "Firefighters on duty" as the group identifier of the firefighters for the rescue operation. The available group identifiers for the operation, such as "Firefighters from fire station B" or "Firefighters on duty", are provided by the authorized issuer. Authorized issuers may communicate with each other for this purpose. For example, the head of fire station A and the head of fire station B may exchange the list of their members participating in a rescue operation if no higher authorized issuer is present at the rescue operation. In case the head of fire station A and the head of fire station B do not know each other's temporary identifiers, that information may be provided via a secure out-of-band channel, for example, by manual entry at the UE, or using encrypted Near Field Communication (NFC) techniques.

Figure 11:
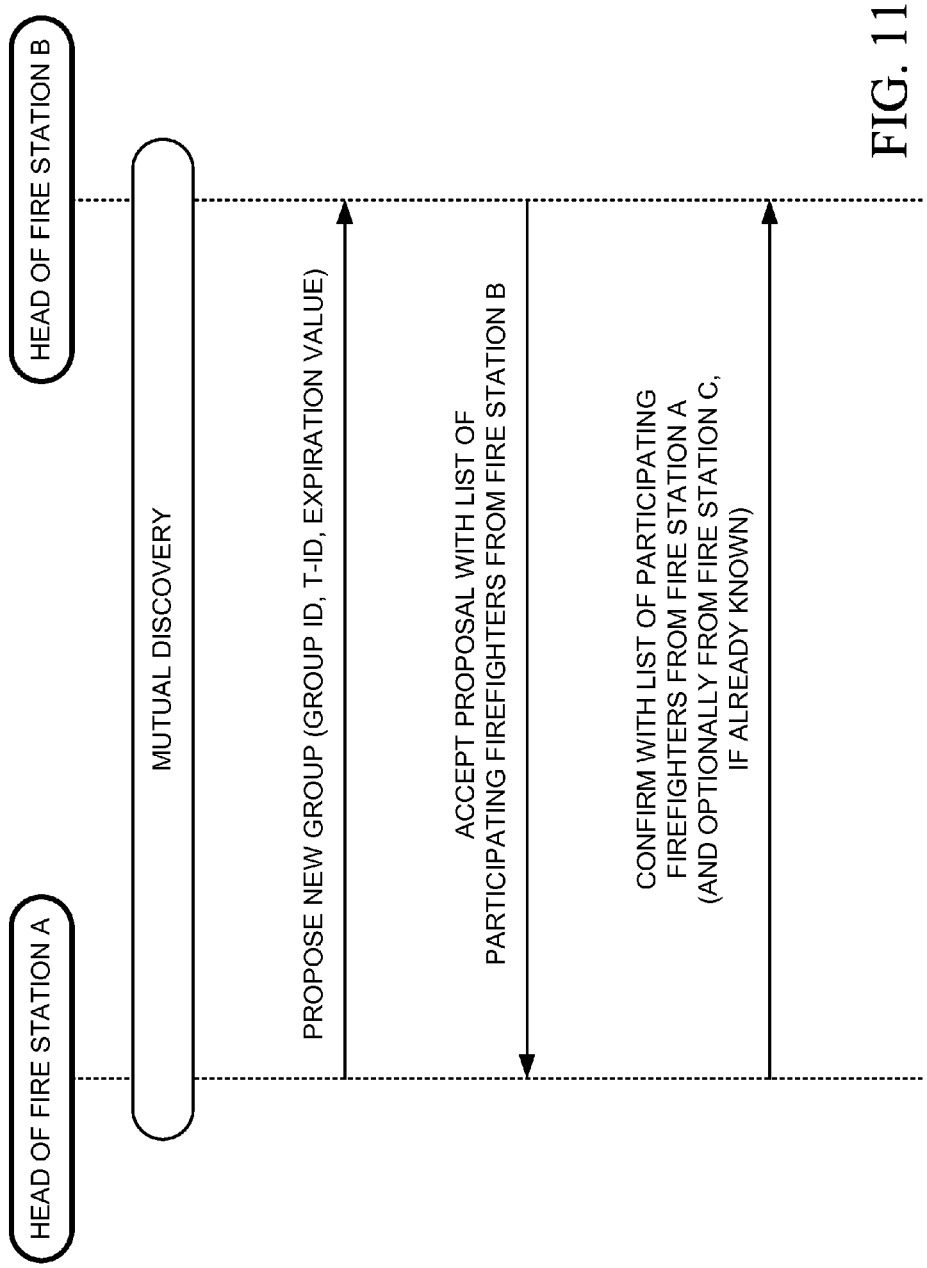
FIG. 11 is an example illustration of how a group can be created on-the-fly when out of network coverage.

FIG. 11 illustrates how a group may be created on-the-fly when the UEs are out of network coverage. In the example presented in FIG. 11, the head of fire station A and the head of fire station B are present at a mission field and they agreed to form a new group on-the-fly. After performing mutual discovery process which includes mutual authentication, the head of fire station A sends a message proposing a new group with a proposed group identifier to the head of fire station B. The message may also contain the temporary identifier associated with the group and an indication of the expiration value. The head of fire station A receives a message from the head of fire station B. The message includes the indication of proposal acceptance along with the list of participating fire fighters from the fire station B. The list may contain a long-term identifier, a temporary identifier, an indication of the expiration value, and optional credential information of the participating firefighters from fire station B. These may be received over a number of messages. After receiving message(s) from the head of fire station B, the head of fire station A sends a message to the head of fire station B including the long-term identifier, the temporary identifier, an indication of the expiration value, and optional credential information of the participating firefighters from fire station A. The message may include the list of participating firefighters from any other fire stations if the head of fire station A already knows the list. These can be sent over a number of messages. After forming the new group, both heads of fire stations A and B can announce the new group to their own firefighters including the group name, the temporary identifier associated with the group, and an indication of the expiration value associated with the temporary identifier in a secure way. The details of this message belong to the application protocol and are beyond the scope of this document.

What is claimed is:

1. A method for facilitating discovery of a discoverable user equipment (UE), the method comprising:
receiving, at a second UE and from the discoverable UE, a request for a temporary identifier for the discoverable UE, the request including a long-term identifier of the discoverable UE, wherein the second UE has a higher class than the discoverable UE in a hierarchy of UEs and is authorized to issue the temporary identifier to the discoverable UE, the discoverable UE is in a lower class than the second UE and is not authorized to issue a temporary identifier to the second UE, and the long-term identifier is an International Mobile Subscriber Identity of the discoverable UE; and
responsive to receiving the request:
assigning, at the second UE, a temporary identifier to the discoverable UE in an assignment;
assigning, at the second UE, an expiration value to the assignment;
associating, at the second UE, the temporary identifier and the expiration value to the long-term identifier; and
providing, by the second UE, the temporary identifier and an indication of the expiration value to the discoverable UE;
receiving, at the second UE, an inquiry from a third UE that is different than the second UE and the discoverable UE, wherein the inquiry includes the long-term identifier of the discoverable UE; and
in response to the inquiry, sending, by the second UE to the third UE, the temporary identifier and the indication of the expiration value of the discoverable UE.

2. The method as claimed in claim 1, further comprising:
responsive to receiving the request, providing an application server with the long-term identifier in an authentication procedure,
wherein assigning the temporary identifier to the discoverable UE, assigning the expiration value to the assignment, associating the temporary identifier and the expiration value to the long-term identifier, and providing the temporary identifier and the indication of the expiration value to the discoverable UE occur responsive to success of the authentication procedure.

3. The method as claimed in claim 1, the method further comprising:
evaluating a renewal condition;
extending the expiration value; and
providing to the discoverable UE an indication of the extended expiration value.

4. The method as claimed in claim 3, wherein the renewal condition includes one or more of expiry of a wake-up timer or reception of a renewal request from the discoverable UE.

5. The method as claimed in claim 1, the method further comprising:
evaluating a re-issue condition;
assigning a new temporary identifier to the discoverable UE in a new assignment;
assigning a new expiration value to the new assignment;
associating the new temporary identifier and the new expiration value to the long-term identifier; and
providing the new temporary identifier and an indication of the new expiration value to the discoverable UE.

6. The method as claimed in claim 5, wherein the re-issue condition includes one or more of expiry of a wake-up timer or reception of a re-issue request from the discoverable UE.

7. A method at a discovering user equipment (UE) for facilitating discovery of a discoverable UE that is different than the discovering UE, the method comprising:
sending, from the discovering UE to a UE of higher class than the discoverable UE in a hierarchy of UEs, an inquiry that includes a long-term identifier of the discoverable UE, wherein the long-term identifier is an International Mobile Subscriber Identity of the discoverable UE, the UE of higher class is authorized to issue the temporary identifier to the discoverable UE, and the discoverable UE is not authorized to issue a temporary identifier to the UE of higher class;

responsive to sending the inquiry, receiving, at the discovering UE and from the UE of higher class, a temporary identifier for the discoverable UE and an indication of an expiration value for the temporary identifier;

associating internally the temporary identifier and the expiration value to the long-term identifier of the discoverable UE;

receiving a broadcast of the temporary identifier; and identifying the long-term identifier based on the internal association.

8. A method at a discoverable user equipment (UE) for facilitating discovery of the discoverable UE, the method comprising:

sending, from the discoverable UE to a UE of higher class than the discoverable UE in a hierarchy of UEs, a request for a temporary identifier for the discoverable UE, the request including a long-term identifier of the discoverable UE and the long-term identifier being an International Mobile Subscriber Identity of the discoverable UE, wherein the UE of higher class is authorized to issue the temporary identifier to the discoverable UE, and the discoverable UE is not authorized to issue a temporary identifier to the UE of higher class;

responsive to sending the request:
receiving, from the UE of higher class, a temporary identifier for the discoverable UE and an indication of an expiration value for the temporary identifier; and associating the temporary identifier and the expiration value to the long-term identifier.

9. The method as claimed in claim 8, the method further comprising:

broadcasting the temporary identifier; and responsive to broadcasting the temporary identifier, receiving from a discovering UE an attempt to initiate application-layer communication with the discoverable UE.

* * * * *